United States Patent Office 3,169,912
Patented Feb. 16, 1965

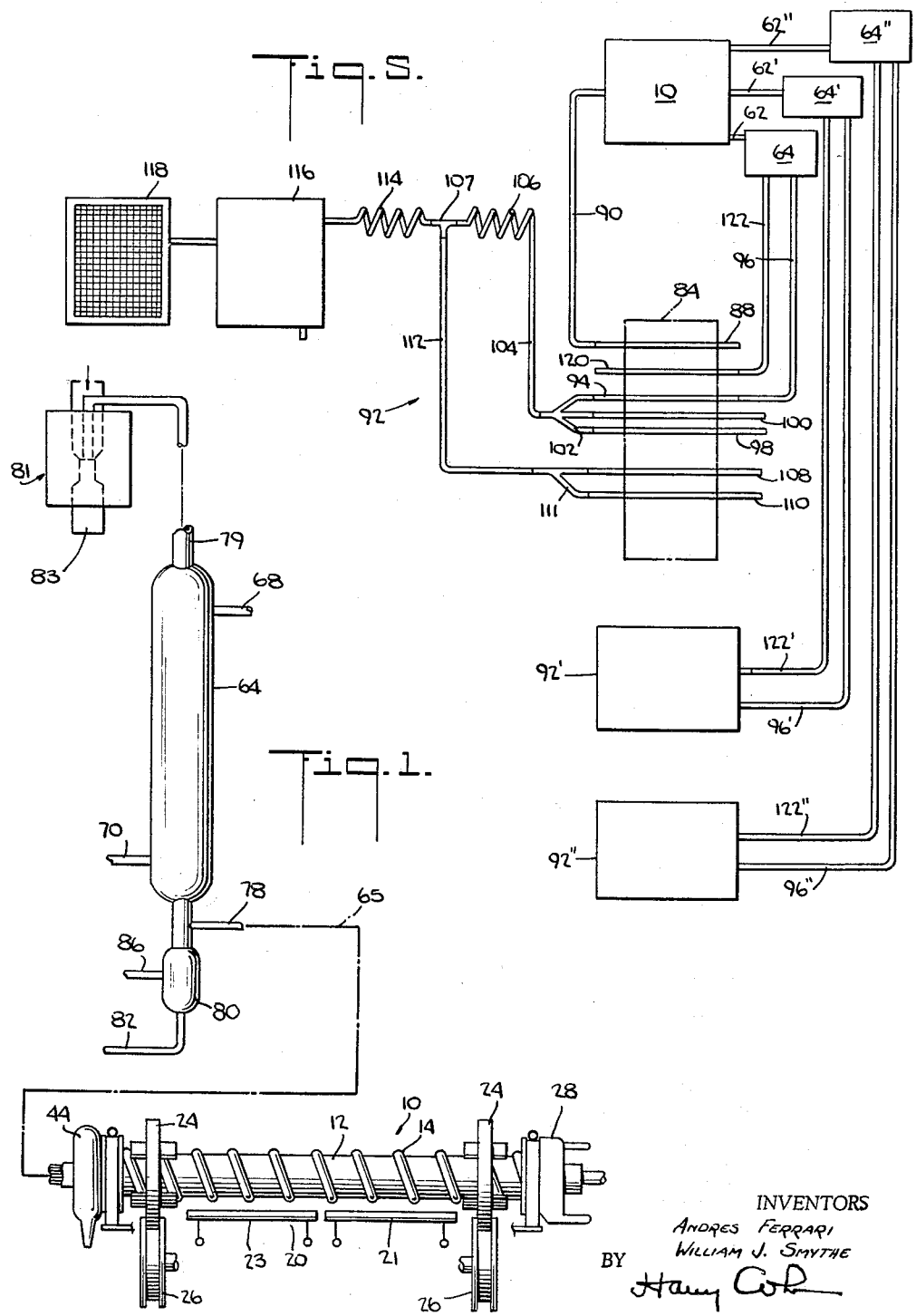

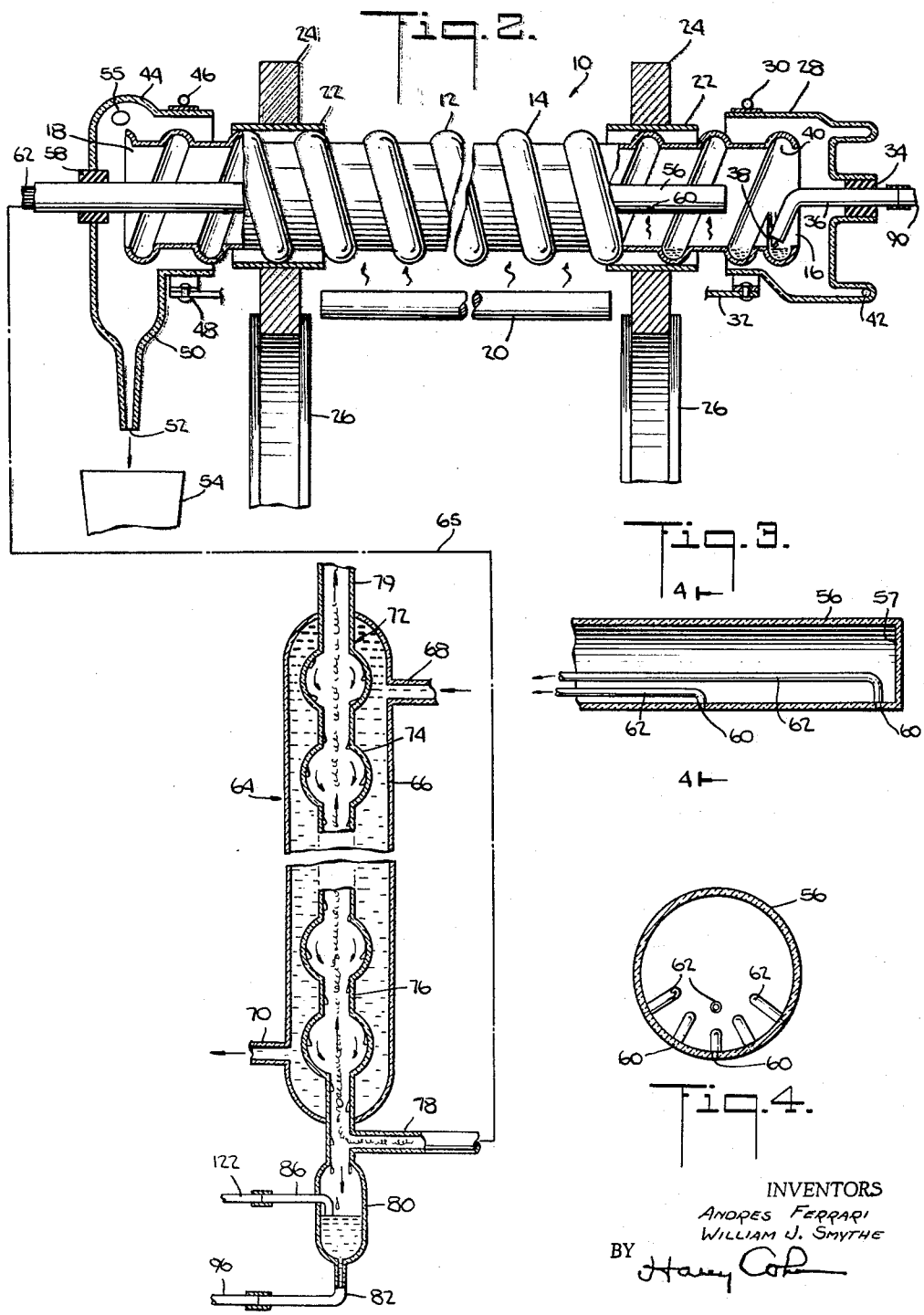

3,169,912
CONTINUOUS DISTILLATION APPARATUS
Andres Ferrari, Scarsdale, N.Y., and William J. Smythe, Westfield, N.J., assignors to Technicon Instruments Corporation, Chauncey, N.Y., a corporation of New York
Filed Nov. 13, 1961, Ser. No. 151,882
5 Claims. (Cl. 202—238)

This invention relates to fractional distillation and, more particularly, to an apparatus for the continous distillation of a liquid into its separate fractions.

One of the objects of the present invention is to provide an apparatus for the continuous fractional distillation of a liquid having improved means for collecting the separate vapor phase fractions of the liquid under distillation.

Another object is the provision of continuous fractional distillation apparatus with means for simultaneously collecting and treating the fractions of the liquid for quantitative analysis.

A further object is to provide a continuous fractional distillation apparatus of generally improved construction and operation.

The above and other objects, features and advantages of the invention will be more fully understood from the following description of the invention considered in connection with the accompanying drawings which are illustrative of the invention and are not in limitation thereof.

In the drawings:

FIG. 1 is a vertical view illustrating the fractional distillation apparatus and a condenser in accordance with the invention;

FIG. 2 is a vertical sectional view of the apparatus of FIG. 1 but on a larger scale;

FIG. 3 is a vertical sectional view, on a larger scale, of part of the apparatus of FIG. 2;

FIG. 4 is a cross section, on a larger scale, taken on line 4—4 of FIG. 3; and

FIG. 5 is a more or less diagrammatic view illustrative of the method and apparatus of the present invention.

Referring now to the drawings in detail and especially to FIGS. 1 to 4, the continuous fractional distillation apparatus 10 comprises a liquid heating or distillation vessel in the form of a horizontal cylinder 12, preferably made of heat resistant glass, which is mounted for rotation about its longitudinal axis in a heating oven (not shown). The distillation cylinder is provided with a helical groove 14 along its inner surface co-axial with the axis of rotation of the cylinder so that the liquid which is supplied to the cylinder through its open inlet end 16 is caused to flow through the tube, during rotation of the cylinder, in contact with the inner surface of the lower portion of the cylinder to the open outlet end 18. During the flow of the liquid through the helical passage provided by groove 14, the lower portion only of the cylinder is heated by the electric resistant heater 20 which is disposed below and slightly spaced from the lower portion of the cylinder and extends longitudinally thereof. It is to be observed that the lower portion only of the cylinder is heated by the heater and it is this portion of the cylinder whose inner surface is covered by the liquid which is being conveyed through the helical passage of the cylinder due to its rotation. If desired or as necessary, separate electric heaters 21 and 23 may be provided which are operable at different temperatures to transmit different amounts of heat to the liquid and it will be understood that each heater can be of the adjustable type for controlling the heating of the liquid.

It will be understood that the quantities of liquid which flow into and out of the cylinder are so regulated that the liquid flows only as a helical stream in the helical passage during rotation of the cylinder whereby mixing of successive portions of the liquid stream during its flow through the passage is prevented so that contamination of one portion of the stream by a preceding portion is prevented. It is to be observed that the temperature of the liquid flowing through the cylinder increases as it flows from the inlet end of the cylinder to the outlet end and various fractions of the liquid separate from the liquid at points spaced longitudinally from each other along the cylinder depending upon the volatility of the fractions, i.e., the more volatile fractions of the liquid separate from the liquid in the form of a vapor at points nearer the inlet end 16 of cylinder 12 than the less volatile fractions which require more heating for separation from the liquid and therefore form at points further downstream.

For rotating the cylinder, each end of the cylinder is provided with a pair of clamping plates 22 which engage the outer surfaces of the cylinder to permit mounting of the rollers 24 on the ends of the cylinder. The rollers are driven by a pair of grooved wheels 26 which are driven by suitable means not shown.

The open inlet end 16 of the cylinder is enclosed by a stationary inlet cap 28 which is supported by a spring clip 30 which is connected to a bracket 32 that is suitably connected to the housing (not shown) of the apparatus and it is to be observed that the cap surrounds the inlet end of the cylinder and is spaced therefrom so as not to interfere with the rotation of the cylinder. The cap is provided with a plug 34 which supports an inlet tube 36 whose outlet end 38 is in communication with an endless cylindrical groove 40 provided at the inlet end of the cylinder 12 perpendicular to the axis of rotation of the cylinder. This groove 40 is in liquid flow communication with the helical groove 14 so that liquid is transmitted from the groove through the helical passage of the cylinder 12 by rotation of said cylinder. The lower portion of the cap is provided with a liquid outlet 42 for draining any liquid which may deposit in the bottom of the cap.

The helical passage 14 of the distillation cylinder extends from cylindrical groove 40 to the outlet end 18 of the cylinder so that liquid is conveyed by the rotation of the cylinder through said outlet end. A stationary outlet end cap 44 encloses the outlet end of the cylinder and is supported on the side of the housing of the apparatus by a spring clip 46 and bracket 48 in a manner similar to the described support for the inlet cap 28. The lower portion 50 of the outlet end cap is funnel shaped and receives the residual liquid which flows from the outlet end 18 of the cylinder and is provided with an outlet opening 52 for discharging the residual liquid into a suitable receptacle 54 or to waste. The end caps 28 and 44 are preferably made of heat-resistant glass. Cap 44 may be provided with a vapor off-take opening 55 connected to a water operated aspirator and vapor condenser.

A longitudinally extending hollow glass tube 56 is positioned in cylinder 12 and is suitably supported on outlet end cap 44, for example by a non-metallic plug 58 fixed in said end cap. The tube is closed at its inner end 57 (FIG. 3) and is provided with a series of longitudinally spaced openings 60 which are preferably arranged symmetrically in the lower part of the tube about a vertical axis, as best seen in FIG. 4. A series of longitudinally extending vapor take-off glass tubes 62 is disposed within hollow tube 56 and one end of each of the tubes is fused or otherwise connected to one of the openings and the opposite ends of the tubes extend outwardly beyond end cap 44. A condenser 64 is provided for each tube 62 and the end of the tube which extends outwardly from the cylinder 12 is connected in fluid flow communication with the condenser, as indicated by the dot-dash line 65. It will be apparent that each of the vapor offtake tubes 62 is operative to withdraw the vapor fraction which is formed adjacent to the companion opening 60 and a plurality of separate vapor fractions of the liquid are formed and are continuously withdrawn from the cylinder during the rotation thereof and the heating of the liquid as it flows from the inlet end of the cylinder to the outlet end thereof.

The condenser 64 is preferably made of heat resistant glass and comprises a vertically extending hollow vessel 66 which is provided with an inlet 68 and an outlet 70 for the flow of water or other cooling fluid into and out of the vessel. A condensing tube 72 is disposed vertically in vessel 66 and is formed of a series of vertically spaced hollow spherical portions 74 which are separated from each other by intervening cylindrical tubular portions 76 whose cross sectional areas are smaller than the cross sectional areas of the spherical portions 74 so that the liquids and vapors which flow through tube 72 increase and decrease in velocity as they flow through tubular portions 76 and spherical portions 74, respectively. This results in a better mixing or turbulence of the downwardly flowing condensed liquids and the upwardly flowing vapor from the distillation cylinder 12.

The inlet 78 to the condensing tube 72 is positioned below or near the lower end of vessel 66 and the outlet 79 from the condensing tube extends outwardly from vessel 66 and is connected to a suitable source of suction, for example an aspirator 81 (FIG. 1) which may be utilized in conjunction with the supply of the cooling liquid to the condenser. The aspirator is of a well known type which is operated by means of a stream of liquid which can be the cooling liquid from outlet 70 of the condenser. The outlet of the aspirator for the liquid and vapors from the condenser is indicated at 83. Said aspirator and vapor condenser may also be connected to the vapor take-off outlet 55 of cap 44.

The lower part of condensing tube 72 is provided with an enlarged portion 80 which provides a reservoir for the condensed liquid or distillate and said reservoir is provided with an outlet 82 which is connected to the bottom of the reservoir. Said outlet is in liquid flow communication with pump 84 (see FIG. 5) for withdrawing the distillate from the condenser and an aspirating tube 86 is disposed within reservoir 80 to provide an overflow outlet to limit the level of distillate in the reservoir.

During operation of the apparatus, the fraction of the liquid in the vapor phase is withdrawn from the distilling cylinder 12 through one of the tubes 62 because of the sub-atmospheric pressure in tube 72 of the condenser and enters said tube through inlet 78 and flows upwardly through said tube. During its upward flow, the vapors are cooled and condensed and flow downwardly in the tube 72 and are collected at the bottom of the tube in reservoir 80 and the distillate is withdrawn therefrom in the form of a liquid stream through outlet 82 by the action of pump 84. Excess liquid which tends to rise above the level of the liquid in reservoir 80, as shown in FIG. 2, is withdrawn from the reservoir through tube 86 which is also connected to pump 84, if so desired, it being understood that excess liquid need not be pumped from the reservoir but can overflow therefrom through outlet 86.

The operation of the fractional distillation apparatus 10 will now be more fully described with respect to FIG. 5 which illustrates the apparatus with provision for continuously analyzing the various distillates concurrently with the flow of the liquid through the apparatus for the fractional distillation. The sample liquid which is to be investigated or analyzed in accordance with the present invention may be in the form of a continuous stream as in the case of a monitoring opeartion for controlling the production of a substance or may be in the form of a liquid stream containing a series of separate samples which are supplied from a suitable sample supply device, for example one similar to that shown in the U.S. application of Jack Isreeli, Serial No. 664,403, filed June 18, 1957, which is assigned to the assignee of the present application or one which may be of a construction shown and described in U.S. Patent No. 2,879,141, issued March 24, 1959. The sample liquid stream is supplied to the pump tube 88 of the proportioning pump 84 which is schematically illustrated and which may be of any suitable type though it is preferably of the type described in U.S. Patent No. 2,893,324, issued July 7, 1959. Briefly described, the pump comprises a plurality of resilient flexible tubes which are compressed progressively along their lengths for the pumping operation by the engagement therewith of a plurality of pressure rollers which move longitudinally of the pump tubes to fully close said tubes progressively along their lengths and thus propel the liquid or other fluids for transmitting them from sources of supply to points of delivery.

As herein shown, the sample liquid which is to undergo fractional distillation is transmitted by the pump tube 88 and conduit 90 to the inlet tube 36 of the fractional distillation apparatus 10. As illustrated in FIG. 5, only three condensers 64, 64' and 64'' are shown connected to the outlet of the fractional distillation apparatus 10 through their companion aspirating tubes 62, 62' and 62'', respectively, but it will be understood that as many condensers and aspirating tubes can be provided as desired or as necessary for condensing the various fractions of the liquid and treating each fraction separately for analysis with respect to a constituent thereof. The treatment and analysis apparatus associated with condenser 64 is indicated by the reference numeral 92 and the treatment and analysis apparatus associated with condensers 64' and 64'', respectively, are indicated by the reference numerals 92' and 92'', it being understood that the treatment and analysis apparatus 92, 92' and 92'' are identical so that only apparatus 92 will be described.

The treatment and analysis apparatus 92 is preferably of the type shown and described in U.S. Patent No. 2,797,149, issued June 25, 1957, and includes the proportioning pump 84. Apparatus 92 is operable to continuously withdraw the distillate from reservoir 80 of the condenser 64 in the form of a stream and treat the liquid of the stream for colorimetric analysis wiith respect to a constituent thereof. More specifically, the proportioning pump 84 includes a pump tube 94 which is connected to the outlet 82 of th econdenser via conduit 96 so that operation of the pump withdraws the distillate from the reservoir. The distillate may be mixed with a processing liquid or diluent which is supplied to pump tube 98 and air is supplied to pump tube 100 for segmentizing the liquid stream as described in the aforementioned patent. The fluids join each other in fitting 102 and the segmented liquid stream flows through conduit 104 to a horizontal helical mixing coil 106 wherein the distillate and processing liquid of each liquid segment are mixed together and the mixed segmented stream joins a segmented stream containing a color producing reagent in fitting 107. The color producing reagent is supplied through pump tube 108 and the segmentizing air is supplied through pump tube 110 and joins the reagent stream in fitting 111 and flows from said fitting to fitting 107 via conduit 112. The resulting stream is transmitted from fitting 107 to another helical mixing coil 114 wherein the constituent liquids in each liquid segment of the stream are mixed together to provide a color reaction which is indicative of the quantity of the constituent of the distillate. The color reacted stream is transmitted to a colorimeter 116 of the continuous flow type for the colorimetric examination of the liquid stream and the results of the examination are recorded on a recorder 118.

The proportioning pump is provided with a pump tube 120 which is connected to aspirating tube 86 of the condenser 64 through conduit 122 for maintaining a predetermined level of liquid in reservoir 80. As indicated previously, conduit 122 need not be connected to the pump but can lead directly to waste or wherever else desired. It will be understood that the treatment and analysis of the distillate from the other condensers occurs in the exact same manner as that just described with respect to the distillate from condenser 64 so that the quantity of a constituent in each of the distillates from the respective condensers may be simultaneously determined.

The apparatus just described is especially useful in the continuous treatment and analysis of substances which contain ingredients which may interfere with the quantitative chemical analysis of the substance with respect to a particular ingredient thereof. In such a case, the ingredient whose quantity is to be determined may be separated by vaporization from the liquid in which it is contained by passing the liquid through the distillation apparatus 10 and thereafter condensing the separated ingredient to form a distillate which is subsequently treated and analyzed in the apparatus 92. In this manner, interference from the other ingredients in the liquid is obviated.

Obviously, the apparatus can be used for many applications. A non-limitative example of an important use of the apparatus is in the continuous determination of the alcohol content of a beer brew which contains many reducing substances which chemically unite with various reagents used in the quantitative determination of the ethyl alcohol content of the brew and thus give a false indication. Pursuant to the invention, the ethyl alcohol is separated from the brew by distillation and thereafter is analyzed, thereby eliminating the interference from the reducing substances which would otherwise occur.

Another example is in the determination of phenols in plant effluent wastes wherein certain volatile phenol fractions are desired for quantitative determination of the phenol content of the wastes but which are in the presence of other phenols or phenol-like compounds which react similarly to the reagent system and thus give false end results. By distilling the sample and performing an analysis on the distillate rather than on the original sample as a whole, in accordance with the invention, such false end results are eliminated.

Certain features shown and described herein are also shown and described in the U.S. application of Andres Ferrari, Serial No. 123,525 filed July 12, 1961, and assigned to the assignee hereof.

While we have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

We claim:

1. Fractional distillation apparatus, comprising:
   (a) a liquid heating vessel mounted horizontally for rotation about its longitudinal horizontal axis and having a liquid inlet and a liquid outlet longitudinally spaced from said inlet,
   (b) said vessel having means operable during the rotation of said vessel for the flow of liquid from said inlet to a point downstream therefrom,
   (c) means for heating said vessel along its length and thereby heating said liquid during its flow,
   (d) means disposed in said vessel and extending longitudinally thereof and having a series of longitudinally spaced openings, and
   (e) a series of tubes, extending longitudinally within said means disposed in said vessel, each of said tubes connected to one of said openings.

2. Fractional distillation apparatus, comprising:
   (a) a horizontal liquid heating vessel mounted for rotation about its longitudinal axis and having a liquid inlet and a liquid outlet horizontally spaced from said inlet,
   (b) said vessel having a helical groove along its inner surface coaxial with the axis of rotation of said vessel for causing the liquid to flow in contact with the lower portion of said inner surface during the rotation of said vessel from said inlet to a point downstream therefrom,
   (c) means for heating said vessel along its length and thereby heating said liquid during its flow,
   (d) means disposed in said vessel and extending longitudinally thereof and having a series of longitudinally spaced openings, and
   (e) a series of tubes, extending longitudinally within said means disposed in said vessel, each of said tubes connected to one of said openings.

3. Fractional distillation apparatus, comprising:
   (a) a horizontal liquid heating cylindrical vessel mounted for rotation about its longtudinal axis and having a liquid inlet and a liquid outlet horizontally spaced from said inlet,
   (b) said vessel having a helical groove along its inner surface coaxial with the axis of rotation of said vessel for causing the liquid to flow in contact with the lower portion of said inner surface during the rotation of said vessel from said inlet to a point downstream therefrom,
   (c) means for heating said vessel along its length and thereby heating said liquid during its flow,
   (d) a hollow tubular member disposed in said vessel and extending longitudinally thereof and having a series of longitudinally spaced openings, and
   (e) a series of tubes, extending longitudinally within said means disposed in said vessel, each of said tubes connected to one of said openings.

4. Fractional distillation apparatus, comprising:
   (a) a liquid heating vessel mounted horizontally for rotation about its longitudinal horizontal axis and having a liquid inlet and a liquid outlet longitudinally spaced from said inlet,
   (b) said vessel having means operable during the rotation of said vessel for the flow of liquid from said inlet to a point downstream therefrom,
   (c) means for heating said vessel along its length and thereby heating said liquid during its flow,
   (d) means disposed in said vessel and extending longitudinally thereof and having a series of longitudinally spaced openings,
   (e) a series of tubes, extending longitudinally within said means disposed in said vessel, each of said tubes connected to one of said openings, and
   (f) means in fluid flow communication with said tubes, respectively, for condensing said separate fractions.

5. Fractional distillation apparatus, comprising:
   (a) a horizontal liquid heating cylindrical vessel mounted for rotation about its longitudinal axis and having a liquid inlet and a liquid outlet horizontally spaced from said inlet,
   (b) said vessel having a helical groove along its inner surface coaxial with the axis of rotation of said vessel for causing the liquid to flow in contact with the lower portion of said inner surface during the rotation of said vessel from said inlet to a point downstream therefrom, (c) means for heating said vessel along its length and thereby heating said liquid during its flow,
(d) a hollow tubular member disposed in said vessel and extending longitudinally thereof and having a series of longitudinally spaced openings,
(e) a series of tubes, extending longitudinally within said means disposed in said vessel, each of said tubes connected to one of said openings, and
(f) means in fluid flow communication with said tubes, respectively, for condensing said separate fractions.

References Cited in the file of this patent

UNITED STATES PATENTS

| | | |
|---|---|---|
| 1,183,457 | Herber | May 16, 1916 |
| 2,385,074 | Guignard | Sept. 18, 1945 |
| 2,621,197 | Thurman | Dec. 9, 1952 |

FOREIGN PATENTS

| | | |
|---|---|---|
| 84,938 | Netherlands | Mar. 16, 1957 |